(12) United States Patent
Young et al.

(10) Patent No.: US 10,409,649 B1
(45) Date of Patent: Sep. 10, 2019

(54) PREDICTIVE LOAD BALANCER RESOURCE MANAGEMENT

(71) Applicant: Amazon Technologies, Inc., Reno, NV (US)

(72) Inventors: Lawrence Shao-Shien Young, Mercer Island, WA (US); Christopher Carson Thomas, Seattle, WA (US); Koji Hashimoto, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1155 days.

(21) Appl. No.: 14/502,424

(22) Filed: Sep. 30, 2014

(51) Int. Cl.
*G06F 9/50* (2006.01)
*G06F 9/48* (2006.01)
*G06N 5/02* (2006.01)

(52) U.S. Cl.
CPC .......... *G06F 9/5083* (2013.01); *G06F 9/4881* (2013.01); *G06N 5/02* (2013.01)

(58) Field of Classification Search
CPC ......... G06Q 10/06; H04L 47/70; H04L 47/12; H04L 67/327; G06F 9/5061
USPC ....................................................... 709/241
See application file for complete search history.

(56) References Cited

U.S. PATENT DOCUMENTS

| | | | |
|---|---|---|---|
| 6,560,609 B1 * | 5/2003 | Frey ........................ | G06F 9/465 |
| 6,965,930 B1 * | 11/2005 | Arrowood ............... | G06F 9/505 |
| | | | 709/223 |
| 7,184,945 B1 * | 2/2007 | Takahashi ............. | G06F 9/5083 |
| | | | 370/389 |
| 2009/0144404 A1 * | 6/2009 | Wolman ................ | G06F 9/5083 |
| | | | 709/223 |
| 2011/0191462 A1 * | 8/2011 | Smith ...................... | H04L 47/70 |
| | | | 709/224 |
| 2014/0280966 A1 * | 9/2014 | Sapuram ............ | G06Q 30/0631 |
| | | | 709/226 |
| 2015/0006730 A1 * | 1/2015 | Helfman ............... | G06F 9/5072 |
| | | | 709/226 |
| 2016/0043951 A1 * | 2/2016 | Srinivas .............. | H04L 67/1027 |
| | | | 370/392 |

* cited by examiner

*Primary Examiner* — Jerry B Dennison
(74) *Attorney, Agent, or Firm* — Davis Wright Tremaine LLP

(57) ABSTRACT

Computing resource service providers allow customers to execute computer systems on hardware provided by the computing resource service provider. The hardware may be distributed between various geographic locations connected by a network. A load balancer may be provided to distribute traffic between the computer systems. Furthermore, computing resource service provider may cause computing resources to be allocated or deallocated to the load balancer based at least in part on various attributes of the computer systems the load balancer is responsible for distributing traffic to. The various attributes may include a capacity of the computer systems.

20 Claims, 8 Drawing Sheets

Matching Table

Backend Computer System Information

| Computer System Type | vCPU | Network Bandwidth | Memory | Load Balancer Capacity Needed |
|---|---|---|---|---|
| A1 Large | 16 | 15 Gbits | 7.5 GiB | 200 Connections |
| A1 Extra Large | 32 | 20 Gbits | 15 GiB | 350 Connections |
| B2 Small | 1 | 5 Gbits | 4 GiB | 150 Connections |
| B3 Medium | 4 | 10 Gbits | 6 GiB | 175 Connections |

Load Balancer Information

| Load Balancer Type | Maximum Capacity |
|---|---|
| LB Small | 25 Connections |
| LB Large | 45 Connections |

PREDICTIVE LOAD BALANCER RESOURCE MANAGEMENT

BACKGROUND

The use of remote computing services, such as remote program execution and remote data storage, has greatly increased in recent years. Customers may reduce expenses and overhead by purchasing these services from a computing resource service provider. Customers of the computing resource service provider can interact with computing systems, services and virtual machine instances which are widely distributed. Customers, for instance, may communicate with computers of other customers to access and/or provide data while using services of a computing resource service provider to operate virtual machine instances executing customer applications. In many instances, customers configure and operate remote virtual machine instances using hardware managed by computing resource service providers, thereby reducing infrastructure costs and achieving other advantages. Customer-configured virtual machine instances are often used to perform a variety of functions that may take place regularly over an extended period of time. In addition, customers may configured virtual machine instances to communicate with other computer systems over a network as part of the performing the variety of functions.

BRIEF DESCRIPTION OF THE DRAWINGS

Various embodiments in accordance with the present disclosure will be described with reference to the drawings, in which:

FIG. 2 shows an illustrative example of a matching table in accordance with at least one embodiment;

DETAILED DESCRIPTION

Figure 1:
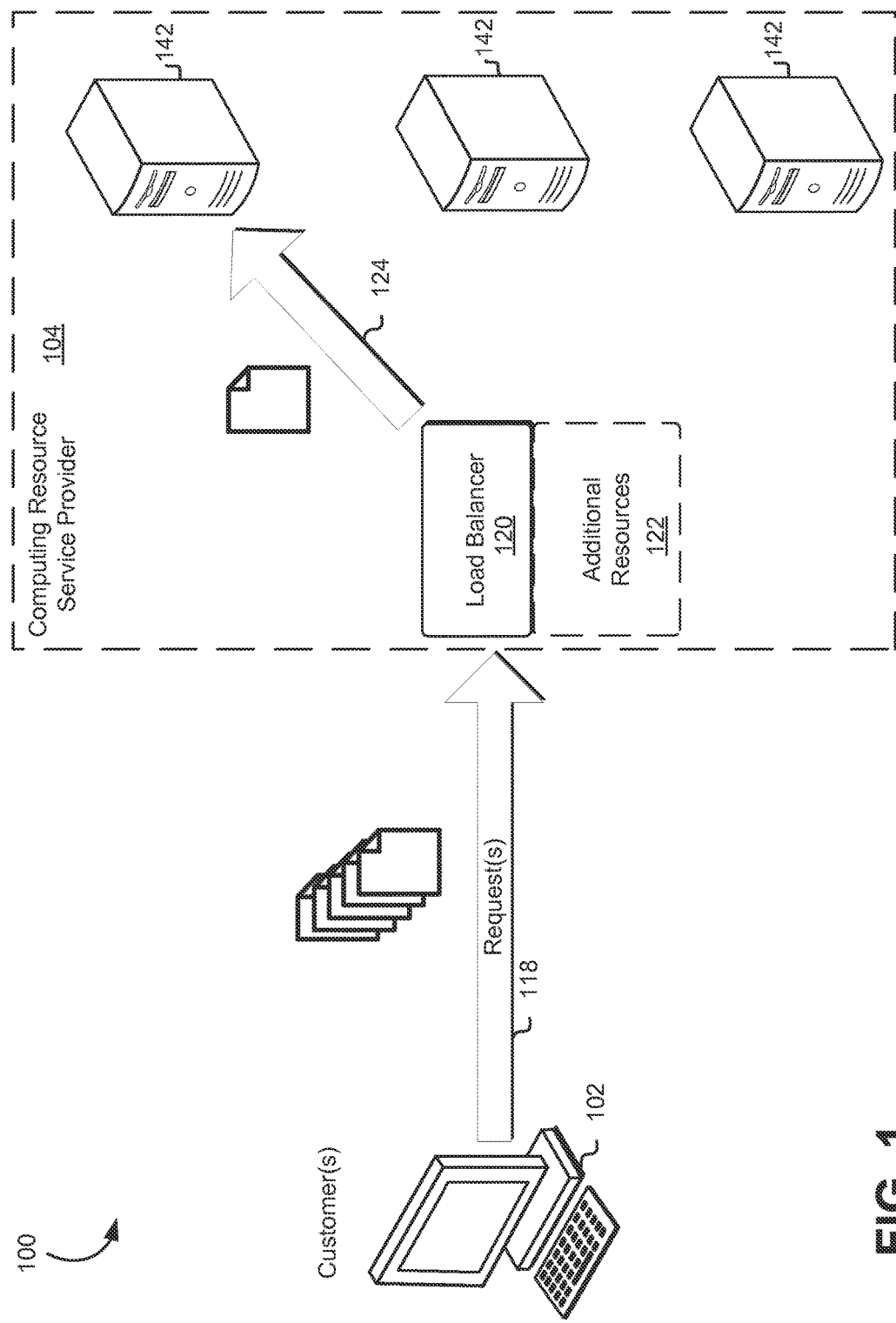
FIG. 1 shows an illustrative example of an environment in which additional computing resources may be allocated to a load balancer in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to enhancements to load balancer computer systems configured to distribute request processing over multiple computer systems connected over a network. The load balancers may be offered to customers of a computing resource service provider in order to facilitate request processing by one or more other computer systems of the customer. For example, the customer may operate a website using computing resources of the computing resource service provider. Additionally, the website may receive requests from multiple other customers over a network. The computing resource service provider may then configure a load balancer to direct the requests to the computer systems executing the website in such a way that the load generated by processing the request is distributed among the computer systems executing the website. At any given point in time, the load balancer may have a fixed capacity (e.g., the maximum number of requests the load balancer may distribute). However, the number of requests received by the load balancer may fluctuate over time and, at certain points in time, may exceed the capacity of the load balancer or may be well below the load balancer's capacity. Therefore, it may be advantageous to configure the load balancer such that the load balancer may predict fluctuations in traffic and increase or decrease capacity in response to the predicted fluctuation in requests.

For example, the computing resource service provider may configure the computing resources executing the load balancers to automatically scale load balancers to process customer traffic. For example, the load balancer may determine that the computer systems operated by the customer are receiving requests at a rate which is 75% of the load balancer's maximum capacity. As a result of the determination, the load balancer may be configured to allocate additional computing resources to the load balancer processing requests for the computer system operated by the customer. Similarly, if the number of requests is below 25%, the load balancer may deallocate resources assigned to the load balancer processing requests for the computer system operated by the customer. By means of automatically allocating and deallocating load balancer resources in response to increases and decreases in customer traffic, the computing resource service provider may increase efficiency. Additionally, there may be very sharp increases in customer traffic and, as a result, if there are not sufficient resources assigned to the load balancer, customer traffic may be dropped or impaired. In response to increases or decreases in traffic, the load balancer may be configured to make the determination to provision resources and perform the provisioning quickly, and to a sufficient level of capacity for the amount of traffic received. Furthermore, the load balancer may be configured to anticipate the increases and decreases in traffic and allocate or deallocate resources ahead of a time anticipated for the increase or decrease in traffic.

This may be accomplished using a variety of different techniques described herein. For example, the load balancer may track the aggregate backend capacity of the customer's computer system (e.g., the capacity of the computer systems operated by the customer to whom the load balancer sends traffic) over time. In some embodiments, the load balancer tracks the number of requests that may be processed by the customer's computer systems (e.g., backend capacity), if there is a new high in the aggregate number of requests the customer's computer system may process, the load balancer may allocate additional computing resources. The customer may assign the additional backend capacity to the load balancer associated with the customer which may indicate a possible spike in traffic to the customer's computer systems.

In some embodiments, the amount of load balancer resources that are allocated may be a fixed ratio of load balancer-to-backend capacity, or may be relative to the amount of change in backend capacity. For example, a matching table may be used to determine the amount of load balancer resources to assign to a particular load balancer, where the matching table indicates the ratio of load balancer-to-backend capacity. If the customer assigns or removes backend capacity managed by the load balancer, the computing resource service provider may allocate or deallocate load balancer resources based on the matching table. Furthermore, in order to conserve resources of the computing resource service provider, the additional load balancer capacity may be decreased after a certain amount of time has elapsed if the additional resources assigned to the load balancer have not been used.

Other mechanisms may include tracking whether a specific load balancer or the set of load balancers associated with the customer historically have spikes in traffic, or the computing resources service provider has failed to allocate additional load balancer resources in time to process the request. If either condition is met for a particular customer, the computing resource service provider may configure the particular customer's load balancer to pre-allocate additional load balancer resources based on predicted traffic and/or configuring the load balancer to be more sensitive to changes in traffic patterns. For example, if the customer traffic patterns include a daily spike at 6:00 p.m., the load balancer may be configured to pre-allocate load balancer resources prior to the daily spike in order to process the predicted traffic spike. In another example, if the customer's traffic history indicated that load balancer capacity has been too low to process customer traffic, the load balancer may be configured to allocate a greater amount of load balancer resources whenever a decision to allocate additional capacity is made. Another mechanism for predicting load balancer traffic and adjusting capacity may include tracking whether there is a sharper increase in traffic than has been historically monitored for a particular load balancer and scaling capacity quicker and/or by assigning a greater amount of load balancer resources. For example, if a traffic spike is observed that is larger than any previously observed traffic spike, the load balancer may reduce the amount of time between decisions to increase load balancer capacity and/or increase the amount of load balancer resources assigned to the load balancer when a decision to increase capacity is made.

FIG. 1 shows an illustrative example of an environment 100 in which load balancer resources may be assigned to a particular load balancer in order to process requests 118 directed at computer systems operated by a customer. A computing resource service provider 104 may provide computing resources to customers 102. The customers 102 may utilize physical hosts 142 operated by the computing resource service provider 104 to perform a variety of functions. For example, the customers 102 may operate a website or log server using the computing resources of the computing resource service provider 104. In some embodiments, the customers 102 may include organizations which operate computing resources which may be accessible to other customers of the computing resource service provider or other entities in general. For example, the customer may operate a website which is accessible to users over a network, such as the Internet. The term "organization," unless otherwise clear from context, is intended to be read in the broad sense to imply a set of principals organized in some manner. The customer may use computing resources of the service provider to operate a load balancer 120 configured to distribute requests 118 to computing resources of the customer. As illustrated in FIG. 1, the computing resources of the customer may include physical hosts 142 operated by the computing resource service provider 104, however the computing resource may include computing resources of the customer or other entities in accordance with the present disclosure. For example, the customer may operate a load balancer 120 using computing resources of the computing resource servicer provider 104 to direct traffic to one or more servers operated by the customer 102.

The requests 118 may be received by the load balancer 120 or by one or more other systems of the computing resource service provider 104, such as a request listener not illustrated in FIG. 1 for simplicity, and directed to the load balancer 120. The load balancer 120 may be a computer system or virtual computer system configured to distribute the request 118 to one or more computer systems, supported by physical hosts 142, in order to optimize resource utilization and/or avoid overloading a particular computer system. For example, the load balancer 120 may include physical hardware connected to a server rack or otherwise included in a data center. In another example, the load balancer 120 may include one or more virtual machines supported by a physical host 142 as described in greater detail below. In some embodiments, the number of requests 118 may be greater than the number of requests that the load balancer 120 may process given the amount of computing resources currently allocated to the load balance 120. As a result, the load balancer 120 or other system of the computing resource service provider 104, such as a management subsystem described in greater detail below, may determine to allocate additional resources 122 to the load balancer 120.

In some embodiments, the additional resources may include instantiating one or more load balancers and assigning the instantiated load balancers to the load balancer 120. Assigning the instantiated load balancers may include updating one or more other computer systems. For example, the request listener described above may be updated with information corresponding to the additional resources 122 in order to route requests. In another example, a Domain Name System (DNS) entry or other naming system service entry may be updated to include an Internet Protocol (IP) address associated with the additional resources 122.

The determination to allocate additional resources 122 to the load balancers 120 may be made based at least in part on information corresponding to the backend capacity of the computer systems assigned to the load balancer 120. For example, the customer 102 may assign additional computer systems to the load balancer 120 through a management console or other application configured to enable the customer to manage computing resources provided by the computing resource service provider 104. The backend capacity may include the aggregate capacity of at least a portion of the computer system assigned to the load balancer 120. Additionally, the determination to allocate additional resources 122 to the load balancers 120 may be made based at least in part on information corresponding to a configuration of the computer systems assigned to the load balancer 120. The configuration may include various inputs to the computer systems assigned to the load balancer 120. For example, the configuration may include various features of the computer systems such as encryption. Furthermore, the configuration may include customer behavior and customer input, including input from the customer and users of the customer. For example, the customer may operate a website using computer systems assigned to the load balancer 120, both the customer's input to the website and user's input to the website may be used to determine whether to allocate or deallocate additional resources 122 to the load balancers 120.

The management console may be exposed to the customer 102 as a webpage wherein the executable code of the webpage is configured to generate application programming interface (API) calls to the computing resource service provider 104. The customer 102 may provide information corresponding to the computer system assigned to the load balancer 120 through the management console. For example, the customer may provide the computing resource service provider 104 with an API call. The API call may indicate a number of backend computer systems to add to the customer's 102 load balancer. The information may include IP addresses of the computer systems, identifiers of the computer systems, computing resources of the computer systems, computational capacity and network capacity of the computer systems, routing information, and any other information configured to enable the load balancer 120 to manage the processing of requests 118 by the computer systems of the customer 102. The request 118 may include various tasks which may be distributed among the computer systems of the customer such as processing HyperText Markup Language (HTML) or other requests, computation of data, processing data, or generally providing data to a requestor.

Furthermore, the computing resource service provider 104 may track requests and other information obtained by the computing resource service provider 104 in order to predict the number of requests 118 that may be received at any given point in time and/or the capacity required by the load balancer 120 in order to process requests for a particular computer system or set of computer systems. For example, the load balancer 120 may determine the amount of additional resources 122 required based at least in part on a previously observed spike in traffic and a matching table indicating a ratio of load balancer capacity-to-backend capacity. Information corresponding to the request may be provided to a predictive modeling engine configured to determine an amount of requests that may be received at a point in time and/or an amount of capacity needed to process the amount of requests that may be received at the point in time.

FIG. 2 illustrates a matching table 200, as described above, which may provide an amount of load balancer capacity required for processing requests based at least in part on a capacity of the computer systems assigned to the load balancer. The matching table 200 may be generated by an administrator or other entity of the computing resource service provider. In some embodiments, the matching table may be generated by a computer system or virtual computer system of the service provider. The matching table may indicate a mapping of backend capacity to load balancer capacity. As illustrated in FIG. 2, the matching table 200 may include information corresponding to the type of computer system, the computing capacity of the computer system, the network bandwidth of the computer system, the memory of the computer systems, and the amount of load balancer capacity that may be allocated. For example, the matching table may indicate a capacity requirement for the load balancer based at least in part on the computer systems assigned to the load balancer. Furthermore the mapping may be reversible, such that a data value may be converted from load balancer capacity to backend capacity based at least in part on the matching table 200. As described herein the matching table 200 may include a table, an algorithm, a set of operations, a deterministic function, or other mechanism suitable for receiving an input and determining a corresponding output.

Returning to FIG. 2, in an embodiment, the load balancer may receive information indicating the type of computer system assigned to the load balancer and determine based at least in part on the received information and the matching table 200, whether additional capacity is required. For example, a particular load balancer may include 8 nodes of the "LB small" load balancer type with a maximum capacity of 200 connections. The customer may assign to the load balancer a "B2 Small" computer system type, using the matching table 200 the load balancer may determine that amount of capacity needed is 150 connections and may therefore determine that no additional capacity should be allocated. The customer may then assign an "A1 large" to the load balancer and the load balancer may then determine that additional capacity should be allocated based at least in part on the matching table 200. Furthermore, the load balancer may determine the number of load balancer nodes to add to the load balancer based at least in part on the matching table. The determination to increase load balancer capacity and which computing resources to allocate to the load balancer may be made by the load balancer or one or more other systems of the computing resources service provider such as a management subsystem described in greater detail below. In some embodiments, the matching table 200 may include information corresponding to the utilization of the customer's computer systems. This information may be used to adjust the amount of computing capacity allocated to the load balancer. For example, the matching table 200 may indicated that a particular customer's computer systems are on average at an 80% utilization rate. When the customer assign another computer system to the load balancer, the load balancer may determiner to allocate additional computing resources as a result of the customer average utilization as indicated in the matching table 200.

Figure 3:
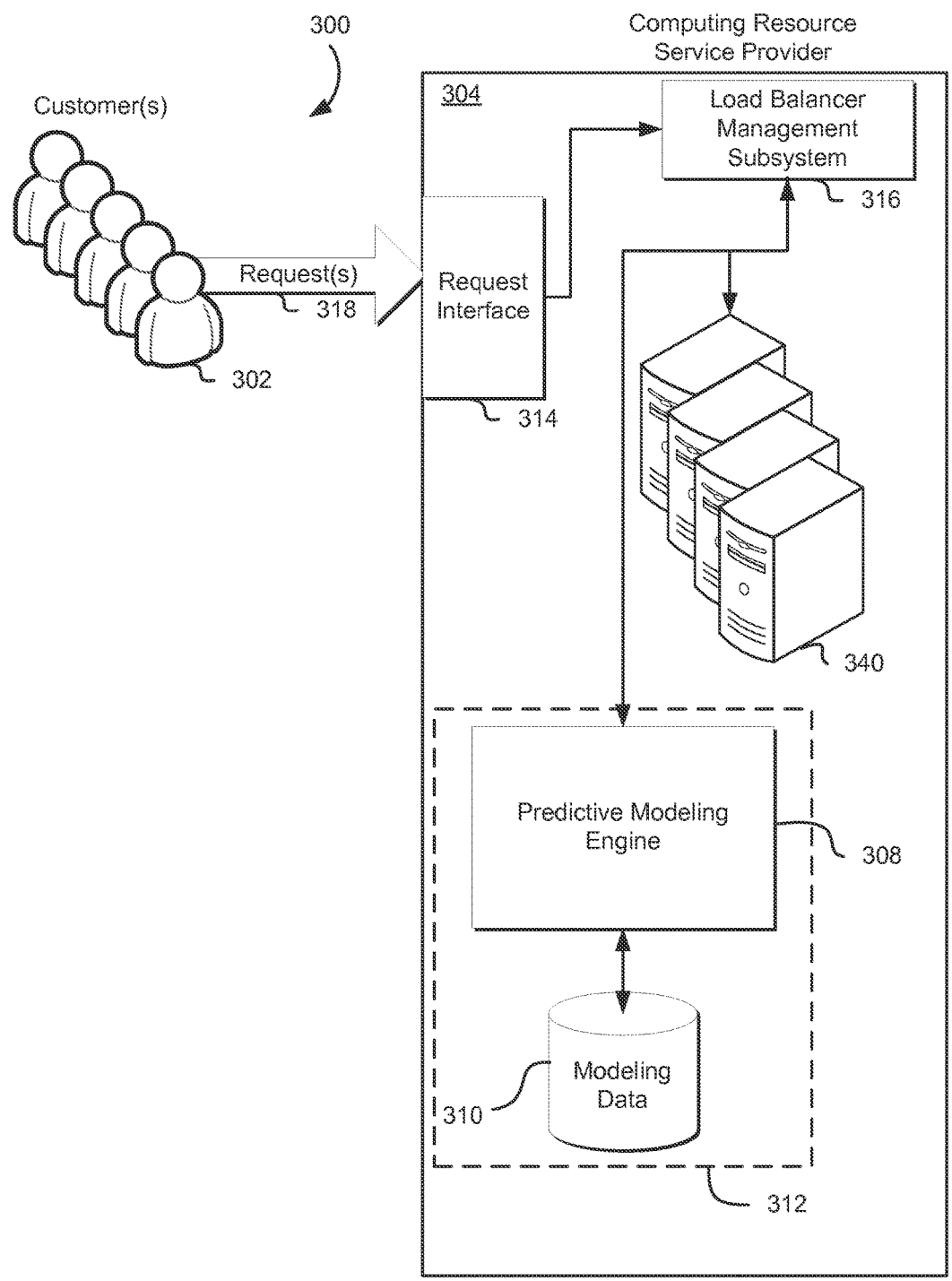
FIG. 3 shows an illustrative example of an environment in which data may be collected and provided to a predictive modeling systems in accordance with at least one embodiment.

FIG. 3 shows an example 300 of customers sending requests 318 to a computing resource service provider 304. The computing resource service provider 304 may provide a variety of services to a customer 302. The customer 302 may send request 318 to the service provider 304 over a network, such as the Internet. The request 318 may be appropriately configured API calls generated by the customer or a management console with which the customer interacts in order to manage the operation of a load balancer as described above. Additionally, the request 318 may include requests to interact with computer systems operated by the customer as described above. In various embodiments, the request 318 may be received by a request interface 314 operated by the service provider. The request interface 314 may direct the request to the appropriate system, such as the load balancer management subsystem 316 shown in FIG. 3. In some embodiments, the request interface 314 may direct the request to the load balancer as described above. In yet other embodiment, the request 318 may be directed directly to the load balancer based at least in part on a DNS entry or other routing information. As requests 318 are received by the request interface 314 or, in some embodiments, the load balancer, information corresponding to the requests may be used to update and/or determine a predictive model.

The predictive model may be configured to receive a set of inputs and calculate a score of the probability (i.e., a score that correlates with the probability) of a particular event given the set of inputs. For example, the set of inputs may include an amount of backend capacity, amount of backend traffic, rate of increase or decrease of backend traffic, number of backend servers assigned to the load balance, features of the backend servers assigned to the load balancer, or any other inputs associated with the backend servers. Based on the obtained input, the predictive model may be used to determine a score for a particular load balancing event, such as an increase or decrease in traffic to the backend servers or a change in the type of traffic directed to the backend servers. For example, the customer 302 may modify the backend server to enable a particular feature such as encrypted traffic, Transport Layer Security (TLS), Secure Sockets Layer (SSL), or other modification to the types of traffic the backend server may receive. Another input may include historical performance of the load balancer to process requests directed to the backend computer systems. For example, if the load balancer had insufficient capacity to process request directed to the backend computer system and/or allocated insufficient capacity to process request during a load balancing event, this information may be provided to the predictive modeling system 312. As a result, the predictive model may be adjusted to increase the amount of computing resources allocated to the load balancer during a load balancing event.

In various embodiments, the load balancer management subsystem may manage the operation of one or more load balancers executed by the system hardware 340. Furthermore, the load balancer management subsystem 316 may be responsible for determining whether to allocate additional computing resources to the load balancer and/or the amount of computing resources to allocate to the load balancer. The management subsystem may also manage the operation of the predictive modeling system 312. The predictive modeling system 312, in various embodiments, contains a predictive modeling engine 308 and modeling data 310 for use with the predictive modeling engine 308. Furthermore, the predictive modeling system 312 may indicate to the load balancer management subsystem 316 a rate at which to increase load balancer capacity. For example, if current backend capacity is at 20 percent of the maximum backend capacity, while the current load balancer capacity is at 80 percent of the maximum, the predictive modeling system 312 may indicate to the load balancer management subsystem 316 to allocate a greater amount of load balancer capacity in response to a load balancing event as a result of the difference between the maximum about backend capacity relative to load balancer capacity.

In various embodiments, the load balancer management subsystem 316 may collect various data sets for use with predictive modeling system 312. Various systems of the present disclosure, such as the load balancer management subsystem 316 and the predictive modeling system 312, may be implemented using one or more computer systems each containing non-transitory computer-readable storage media for storing instructions that when executed cause the system to perform a variety of functions. The load balancer management subsystem 316 may collect data directly from computer systems assigned to the load balancer or from the requests 318 transmitted to the management subsystem 316 from the request interface 314 or load balancer. In various embodiments, the predictive modeling system 312 may collect the data sets itself. The data collected may include information regarding customer usage of computer systems, operations of computer systems, operation of load balancers, computing resources of the computing resource service provider, utilization of various computing resources including the computer systems operated by the customer and the load balancers, or other suitable data for use with predictive modeling. For example, the management subsystem 316 may collect data corresponding to customer behavior from the request 318 received from the request interface. Customer behavior may include assigning or adding computer systems to the set of computer systems assigned to the load balancer. Customer behavior may also include information corresponding to requests, such as the frequency of requests or spikes in the number of requests transmitted over a period of time. The information may be collected and stored in the modeling data 310 data store, for use by the predictive modeling engine 308. In various embodiments, the modeling data 310 data store may be on-demand data storage, block-level storage, or any other suitable data store.

The predictive modeling engine 308 may use data stored in the modeling data 310 storage to generate a predictive model, which may contain one or more classifiers. In various embodiments, modeling data 310 may also contain one or more predictive models and classifiers for use by the predictive modeling system 312 in determining the likelihood of a load balancer event. A load balancing event may include any event for which the load balancer management subsystem 316 or other system may determine to allocate or deallocate computing resources to a particular load balancer. For example, a load balancing event may include an increase in request traffic, a decrease in request traffic, the addition or removal of capacity to one or more of the computer systems assigned to the load balancer, a customer request to increase or decrease the load balancer capacity, an over-utilization or under-utilization of load balancer capacity, or other event that may necessitate allocation or deallocation of computing resources to a particular load balancer.

Multiple predictive models may be correlated and information regarding the predictive models and any correlation may be used to update the predictive models. For example, a predicted increase in request traffic based on daily usage patterns may be correlated with a customer request to add additional computer systems to the set of computer systems assigned to the load balancer. Furthermore, information from one or more predictive models may be used to seed newly created predictive models. For example, customers in a particular geographic location may generate an increased number of requests around the same time each day. A predictive model based at least in part on such customer behavior may be used to seed another predictive model for a new customer in the same geographic area. The predictive modeling engine may use one or more predictive modeling algorithms to generate the predictive model and/or classifiers, such as group method of data handling, naïve Bayes, k-nearest neighbor, majority classifier, support vector machines, logistic regression, uplift modeling or any other suitable predictive modeling algorithm. The generated model and/or classifiers may be used to determine the probability of an event occurring based on a given data set. In various embodiments, the predictive model may be used to determine a schedule or particular time at which various load balancing events may occur. The classifiers may be a model or set of models. Furthermore, the generated model and/or classifiers may calculate a score or other output based on the input (e.g., data set provided) provided to the model and/or classifiers. In some embodiments, a binary value may be calculated indicating whether to allocate computing resources to the load balancer.

For instance, data corresponding to customer behavior may be collected by the load balancer management subsystem 316 and provided to the predictive modeling system 312 for analysis by the predictive modeling engine 308. The predictive modeling engine 308 may determine, using one or more predictive modeling algorithms, that a particular customer receives the greatest number of requests around the same time each day. The predictive modeling system 312 or load balancing management subsystem may, as a result of this determination, initiate operations to allocate additional computing resources to the customer's load balancer at some point in time prior to when the customer may receive the greatest number of requests. In some embodiments, the load balancing subsystem 316 may configure the load balancer to allocate additional computing resources when a determination is made to increase capacity. For example, a particular load balancer may be configured to increase capacity by 5% when utilization of load balancer's resources is above 50%. Furthermore, the predictive modeling system may indicate that the customer's computer system receives 500% increase in the number of requests received at the same time every day. As a result, the load balancer management subsystem 316 may cause the load balancer to increase the percentage of load balance capacity added when utilization of the load balancer's resources is above 50% from 5% to 500%.

The predictive model and any schedule generated in accordance with the predictive model may be based at least in part on information corresponding to the backend capacity (e.g., the capacity of the computer systems assigned to the load balancer). For example, predicted traffic spikes may be correlated to the amount of backend capacity such that the determination to allocate or deallocate computing resources to the load balancer is some percentage of the total backend capacity. The predictive modeling system 312 may initiate load balancing events directly or by submitting appropriately configured API calls to the corresponding system, such as the load balancing management subsystem 316. For example, the load balancing management subsystem 316 may control the allocation and deallocation of computing resources to the load balancer and the predictive modeling system 312 may submit a request to allocate or deallocate computing resources to the load balancer when the probability of the particular load balancing event is at or beyond a predetermined threshold. In various embodiments, the predictive modeling engine 308 monitor requests 318 and determines, based at least in part on the monitored requests, the probability of a load balancing event occurring at some point in the future.

In various embodiments, once the load balancing management subsystem 316 receives a request from the predictive modeling system 312 to perform one or more load balancing operations, the load balancing management subsystem 316 may communicate with the hypervisor or directly with the load balancer itself to initiate the load balancing operations. The predictive modeling system 312 may also communicate with the operating system executing on the load balancer in order to reduce the amount of instance data required to be copied during a serialization event. In some embodiments, the predictive modeling system 312 may also model load balancer behavior in order to determine utilization of the computing resources assigned to the load balancer.

Figure 4:
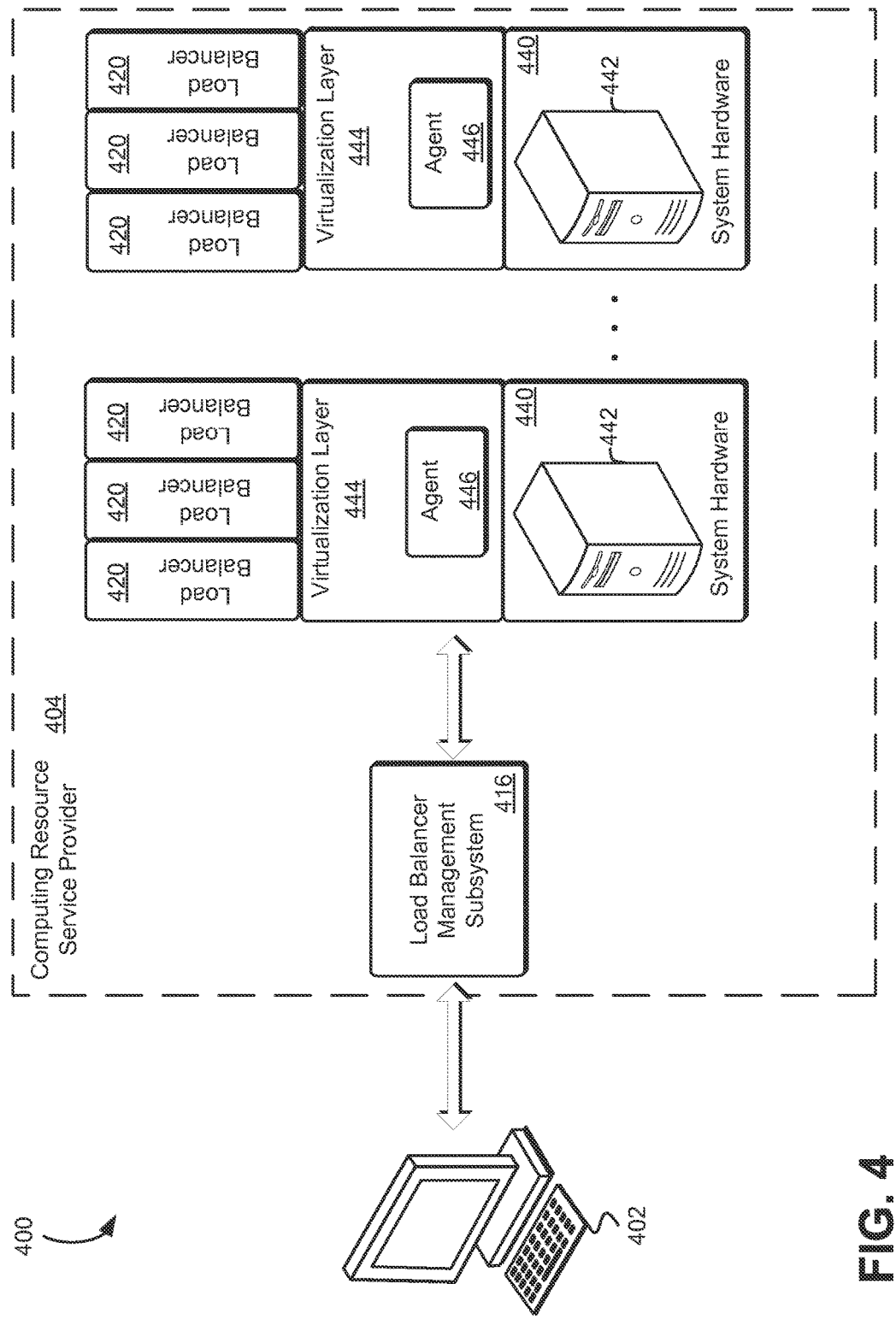
FIG. 4 shows a diagram illustrating a manner in which a load balancer may be managed in accordance with at least one embodiment.

FIG. 4 illustrates an environment 400 in which a load balancer management subsystem 416 may communicate with one or more load balancers in accordance with at least one embodiment. The load balancer management subsystem 416, which may be executed by system hardware 440, is used by a service provider 404 to provide a load balancing service and/or access to load balancing resources by customers. The system hardware 440 may include physical hosts 442. The physical hosts 442 may be any device or equipment configured to execute instructions for performing data computation, manipulation, or storage tasks, such as a computer or a server. A physical host 442 may be equipped with any needed processing capability including one or more processors, such as a central processing unit (CPU), a graphics processing unit (GPU), or a digital signal processor (DSP), memory, including static and dynamic memory, buses and input and output ports that are compliant with any handshaking, communications or data transfer protocol. The system hardware 440 may also include storage devices, such as storage disks and tapes, networking equipment and the like.

A virtualization layer 444 executing on the physical host 442 enables the system hardware 440 to be used to provide computational resources upon which one or more companion load balancers 420 may operate. For example, the virtualization layer 444 may enable a load balancer 420 to access the system hardware 440 on the physical host 442 through virtual device drivers on the load balancer 420. Furthermore, the physical host 442 may host multiple load balancers 420 of the same or different types on the same system hardware 440. The virtualization layer 444 may further include an agent 446 configured to collect load balancer data. The load balancer data may include various metrics data such as the amount of traffic, number of load balancers, the utilization of one or more load balancers, the number of requests processed by the load balancers, virtual machine memory, virtual disk memory, virtual CPU state, virtual CPU memory, virtual GPU memory, operating system cache, operating system page files, virtual machine ephemeral storage, virtual interfaces, virtual devices, number of processors, number of network interfaces, storage space, number of distributed systems, or any other information corresponding to the operation of the load balancers and the computer systems assigned to the load balancers.

The load balancer data may be provided to the predictive modeling system as described above and utilized to generate a predictive model useable in allocating or deallocating computing resources to the load balancers 420. Additionally, the agent 446 may be responsible for communicating information to the load balancers 420 such as whether to allocate or deallocate computing resources and/or the amount of computing resources to allocate or deallocate including particular computing resources to allocate or deallocate. For example, the load balancer management subsystem 416 may determine to allocate a particular load balancer using a particular virtual machine image, described in greater detail below. The agent may communicate to the virtualization layer 444 or the load balancer 420 indicating that the particular load balancer is to be allocated using the particular virtual machine image. In some embodiments, the metrics data may be exposed to the customer through the management console.

The load balancers 420 may be any device, software, or firmware used for distributing requests to various computer systems in a distributed computing environment. For example, the load balancer 420 may, in some embodiments, be implemented as a physical computer system configured to distribute requests as described above. Furthermore, the load balancers 420 may be virtual computer systems executed by the physical host 442 as illustrated in FIG. 4. The virtual computing platform used to execute the load balancers 420 may include various virtual computer components, such as one or more virtual CPUs, virtual memory and the like. The load balancers 420 may be provided to the customers of the computing resources service provider 404 and the customers may assign the computer system to be managed by the load balancers 420. Further, the computing resources service provider 404 may use one or more of its own load balancers 420 to distribute requests within the service provider environment.

In some embodiments, the customers 402 may communicate with the service provider 404 and the customer's load balancer 420 through the load balancer management subsystem 416. For example, the customer 402 may transmit commands and other information to the load balancer management subsystem 416, the commands may indicate operations to be performed by the load balancer. For example, the commands may indicate one or more computer systems to assign to the load balancers. In another example, the commands may indicate a certain amount of capacity the load balancer 420 is to maintain regardless of the amount of utilization of the load balancers computing resources. The commands and other information may be included in an API call from the load balancer management subsystem 416 to the load balancer 420. In some embodiments, the agent 446 may receive information from the load balancer management subsystem 416 and may determine an operation to perform based at least in part on the received information. For example, the agent 446 may receive information indicating a predicted increase in traffic or an increase in backend capacity. The agent 446 may then determine based at least in part on the received information to allocate or deallocate computing resources to the load balancers 420.

Figure 5:
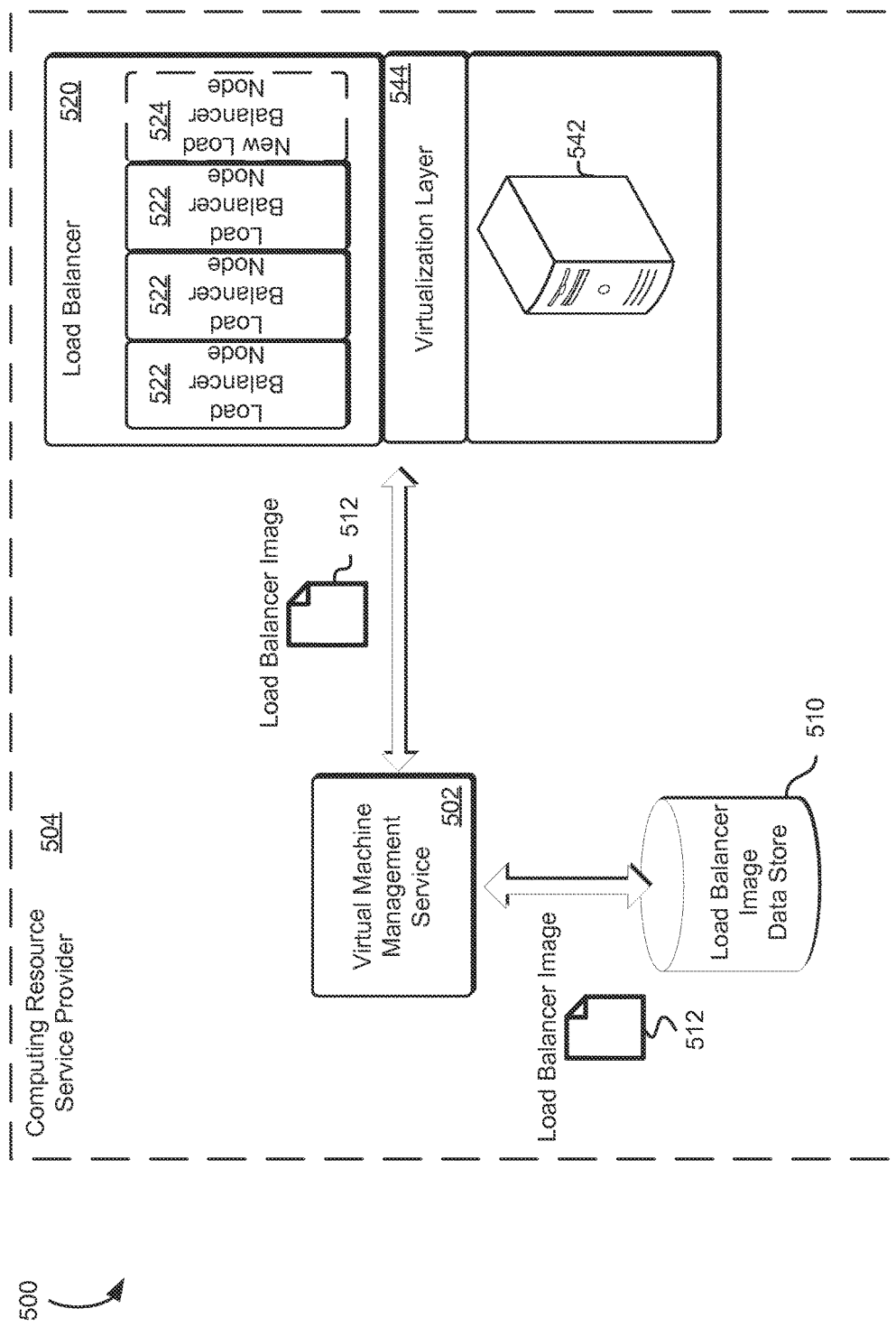
FIG. 5 shows an illustrative example of an environment in which a load balancer may be instantiated in accordance with at least one embodiment.

In order to improve responsiveness to various load balancing events, a predictive model may be used as described above to increase efficiencies in allocating and deallocating computing resources to a load balancer. FIG. 5 accordingly shows an illustrative example of an environment 500 in which a pre-fetched load balancer image 512 may be used during a load balancing event. As illustrated in FIG. 5, a computing resource service provider 502 operates a multitude of physical hosts 542. The physical hosts 542 may be any device or equipment configured to execute instructions for performing data computation, manipulation, or storage tasks, such as a computer or a server. The physical hosts 542 may include any computer system or virtual computer system described above. A virtualization layer 544 operated by the computing resources service provider 502 enables the physical hosts 542 to be used to provide computational resources upon which one or more load balancers 520 may operate. As described above, the virtualization layer 544 may be any device, software, or firmware used for providing a virtual computing platform for the load balancers 520. The virtual computing platform may include various virtual computer components, such as one or more virtual CPUs, virtual memories, virtual disks, and the like.

The load balancer 520 may contain one or more load balancer nodes 522. The load balancer nodes 522 may be virtual computer systems configured to provide computing resources to the load balancer 520 and perform various load balancing operations. In some embodiments, the load balancer 520 and the load balancer nodes 522 operate as a single computing entity performing distribution and balancing operations for the customer computer systems assigned to the load balancer 520. For example, a DNS entry of the load balancer 520 may include the IP address for various load balancer nodes 522 and requests directed to the load balancer nodes 522 may be distributed to the computer systems assigned to the load balancer 520. During a load balancing event requiring the allocation of computing resources to the load balancer 520, a load balancer image 512 may be used to instantiate a new load balancer node 524. When deallocating computing resources to the load balancer 520 operation of one or more of the load balancer nodes 522 may be terminated or suspended. In various embodiments, one or more load balancer nodes 522 may be stored in a cache and assigned to a load balancer when additional computing resources are to be allocated to the load balancer. Assigning the load balancer node 522 in cache to the load balancer may include updating the DNS entry to include the IP address of the cached load balancer node 522.

The load balancer image 512 may be stored in a load balancer image data store 510. The load balancer image data store 510 may be any data store and/or storage device described herein. The load balancer management subsystem 516 may retrieve the load balancer image 512 and provide the load balancer image 512 to the virtualization layer 544 for instantiation. In some embodiments, the load balancer management subsystem 516 may also update the load balancer 520 with information corresponding to the load balancer image 512 and/or the new load balancer node 524. For example, the load balancer management subsystem 516 may update a DNS entry, as described above, as well as indicate to the load balancer the type and/or capacity of the new load balancer node 524 assigned to the load balancer 520. In various embodiments, the capacity of the load balancer may be increased by scaling the load balancer nodes 522 vertically. For example, the processing power and/or bandwidth of one or more of the load balancer nodes 522 may be increased by assigning additional resources, such as virtual CPUs, virtual memory, or virtual network adapters to the one or more load balancer nodes 522.

Furthermore data regarding the operation of the load balancer 520, the load balancer nodes 522, and the new load balancer node 524 may be collected and/or monitored by the load balancer management subsystem 516. Data regarding operation of the load balancer 520, the load balancer nodes 522, and the new load balancer node 524 includes any information regarding the actions performed by load balancer 520, the load balancer nodes 522, and the new load balancer node 524, such as the metrics data described above (e.g., memory usage of the virtual host, file systems, information regarding virtual CPUs, or any other information regarding the load balancer 520 or component thereof). This data may be in any format suitable for operation with the predictive modeling system as described above in reference to FIG. 3. The data may, in some embodiments, be converted into a format suitable for use with the predictive modeling engine. In various embodiments, the metrics data is stored persistently using an on-demand storage service of the computing resource service provider 504 in such a way that the predictive modeling system may use the metrics data to determine the probability of a load balancing event occurring. The metrics data may be used by the predictive modeling system to generate a predictive model capable of indicating the probability of a load balancing event occurring within a certain time interval given one or more inputs.

The virtualization layer 544, the load balancing management subsystem 516, or some other system may perform one or more load balancing operations at some point in time before the time the predictive modeling system determined the load balancing event may occur. For instance, the predictive modeling system may determine that an increase in traffic will occur within the next hour and send a corresponding request to the load balancing management subsystem 516. As a result, at some point before the load balancing event is predicted to occur, the virtualization layer 544 may initiate operations to add the new load balancer node 524 to the load balancer in response to a request from the load balance management subsystem 516. The operations may include retrieving the load balancer image 512 from the load balancer image data store 510 and instantiating the new load balancer node 524 based at least in part on the load balancer image 512.

In some embodiments, the load balancing operations may occur after the customer request. For example, the customer may transmit a request to assign additional computer systems to the load balancer and, as a result, the load balancer management subsystem may determine a particular load balancer image 512 to assign to the load balancer 520 based at least in part on the matching table described above. The load balancer image 512 may correspond to a load balancer with an amount of capacity indicated by the matching table. In another example, the customer may transmit a request indicating an amount of capacity to assign to the load balancer 520 and a minimum amount of capacity the load balancer 520 is to maintain. As a result of the request, the load balancer management subsystem 516 may determine one or more load balancer nodes to assign to the load balance 520 in order to satisfy the customer request based at least in part on the matching table. The load balancer management subsystem 516 may then cause one or more load balancer nodes 522 from the cache to be assigned to the load balancer and/or one or more new load balancer nodes 524 instantiated in order allocate to the indicated capacity to the load balancer 520.

Figure 6:
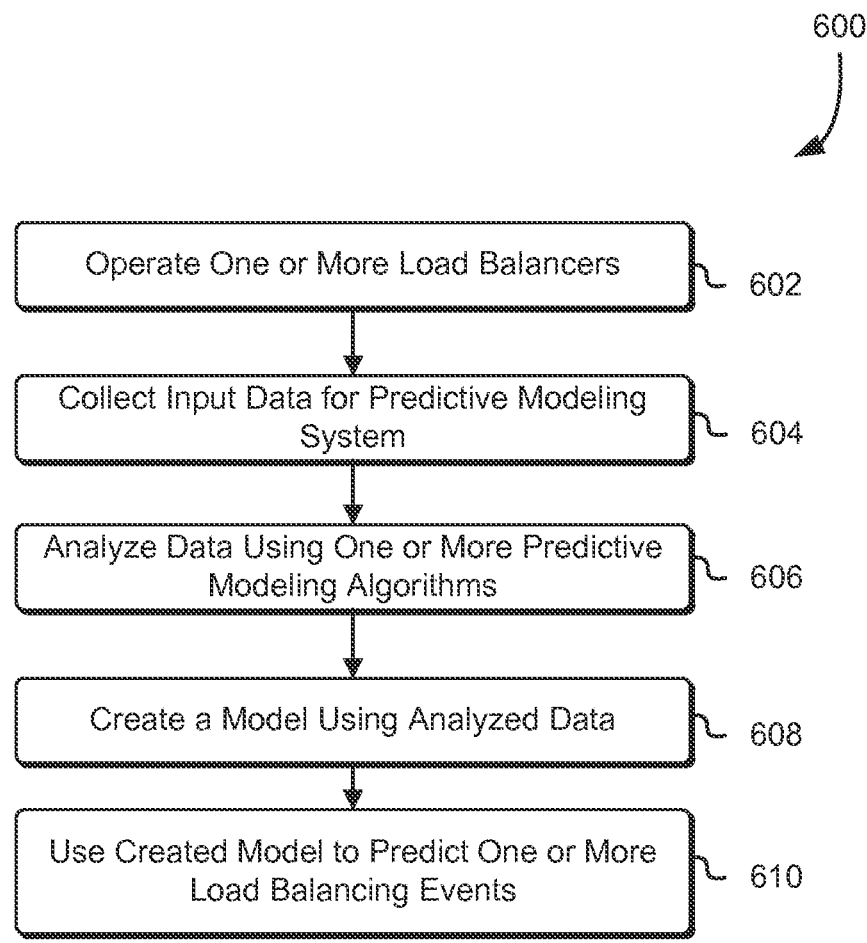
FIG. 6 shows an illustrative example of a process for creating a predictive model in accordance with at least one embodiment.

FIG. 6 shows an illustrative example of a process 600 which may be used to determine the probability of a load balancing event given a particular data set. The process 600 may be performed by any suitable system, such as by the load balancing management subsystem as described above in connection with FIG. 3 and/or other appropriate computer systems, such as by the predictive modeling system. Returning to FIG. 6, in an embodiment, the process 600 includes launching one or more load balancers 602. The load balancer instances may be launched by the computing resources service provider or component thereof, such as the load balancing management subsystem, at the request of one or more customers. The load balancers may be assigned computing resources of the customer for which the load balancers are responsible for distributing the request as described above.

Once the load balancers have be launched, data corresponding to the load balancers may be collected for input into the predictive modeling system 604. For example, the number of requests received by the load balancers over an interval of time may be collected and provided to the predictive modeling system. In another example, information corresponding to the backend computer systems assigned to the load balancers may be provided to the predictive modeling system. Information corresponding to the backend computer systems may include the utilization and maximum capacity of the backend computer systems, such as the processing power and network bandwidth of the backend computing systems. The backend computer systems may include any computer system operated by the customer and assigned to the load balancer. For example, the backend computer system may include a set of virtual machine instances, an application, a messaging server, a webserver, a log server, a database, a storage server, or any other computer system or server which may have traffic to the computer system or server distributed by a load balancer. The information provided to the predictive modeling system may be periodically or aperiodically updated. For example, the agent described above may be configured to collect load balancer and/or backend computer systems data and provide the collected data to the predictive modeling system every minute. The collected input data may then be analyzed using one or more predictive modeling algorithms 606. Collecting and analyzing the data may be performed by any suitable system, such as by the predictive modeling system 312.

Returning to FIG. 6, in various embodiments, the one or more predictive modeling algorithms generate data to be used in creating a predictive model 608. The predictive model may also include one or more classifiers created from the data generated by the one or more predictive modeling algorithms. Once the predictive model and/or classifiers have been created, one or more load balancing events may be predicted based on a given data set. For example, the predictive modeling systems, as described in connection with FIG. 3 and/or an appropriate component thereof, may collect and monitor data corresponding to various aspects of the load balancers and/or backend computer systems assigned to the load balancers. The predictive modeling system may determine based on this information the probability that one or more load balancing events will occur 610. In various embodiments, the probability calculated by the predictive model may be used to determine or predict one or more load balancing events. Information corresponding to the predicted load balancing event may be used to update the predictive model created using the analyzed data. In numerous variations of the process 600, the model created may be continuously or periodically updated with collected input data. For example, customer requests to increase the computing capacity of the computer systems assigned to the load balancer may be collected and provided to the predictive modeling system in order to update the predictive model and/or correlate information with the predictive model.

Figure 7:
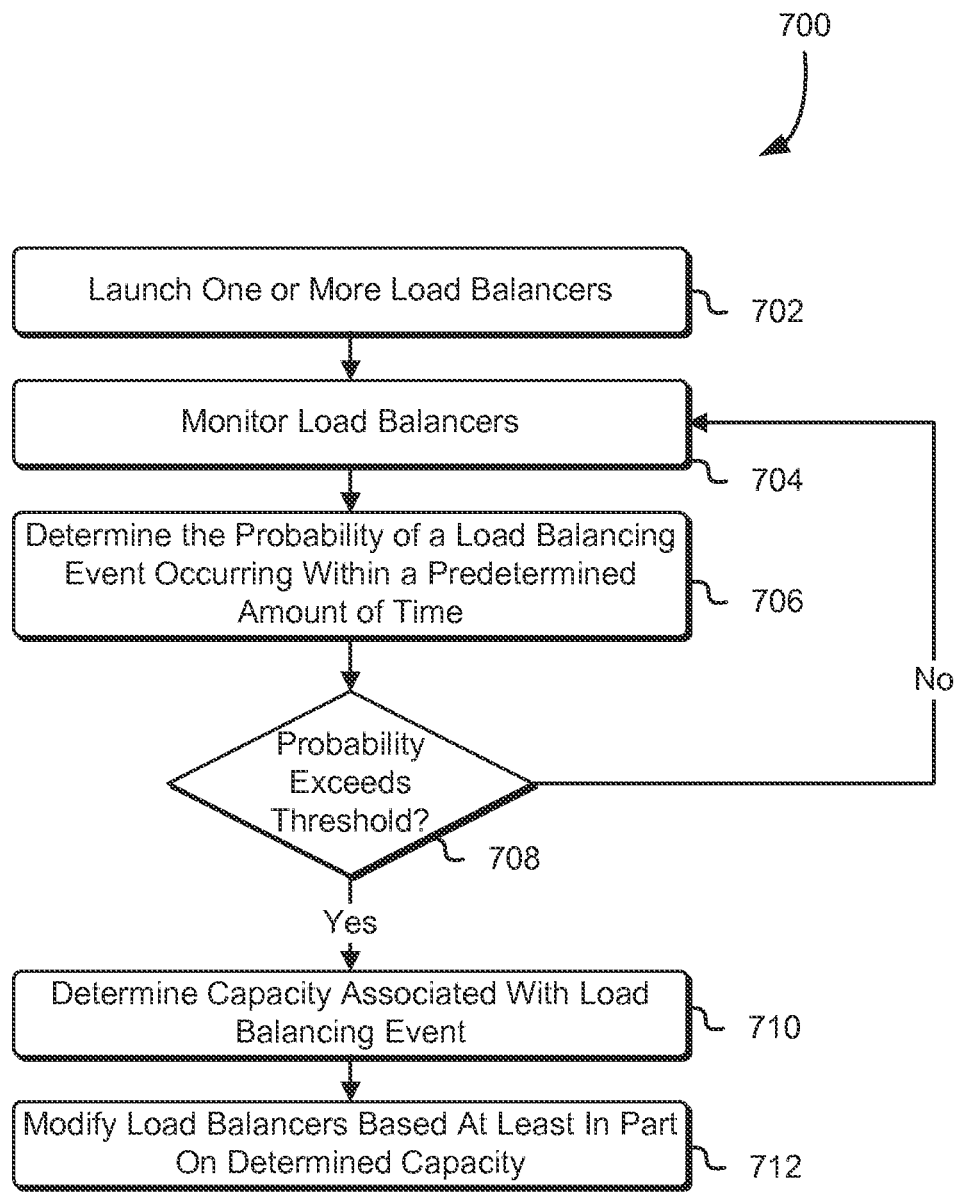
FIG. 7 shows an illustrative example of a process for modifying a load balancer in accordance with at least one embodiment.

FIG. 7 shows an illustrative example of a process 700 which may be used to determine the probability of a load balancing event given a set of data corresponding to one or more monitored load balancers and allocating or deallocating computing resources to the load balancers based at least in part on the probability of the load balancing event. The process 700 may be performed by any suitable system, such as by the load balancing management subsystem as described in connection with FIG. 5 and/or other appropriate computer systems, such as by the agent and/or virtualization layer described above. Returning to FIG. 7, in an embodiment, the process 700 includes launching one or more load balancers 702. The load balancers may be launched by the service provider at the request of one or more customers as described above. In some embodiments, the load balancers may be launched as a result of a customer requesting a computer system from the computing resource service provider. Once the load balancers have been launched, the load balancer may be monitored 704 by an appropriate system or component thereof, such as by the load balancer management subsystem. The load balancers may be monitored in order to collect information corresponding to the request received by the load balancers and/or computer system assigned to the load balancer.

Monitoring the load balancers, in some embodiments, may include monitoring a variety of data or data sets, such as the date and time, operations performed by the customers, operations performed by load balancers, requests received by the load balancers, operations of the computing resource service provider or system thereof, type of load balancer, types of computer systems assigned to the load balancers, load balancer utilization, backend computer systems utilization or any other data suitable for monitoring load balancers. The monitored data may then, using one or more classifiers of a predictive model, be used to determine the probability of a load balancing event occurring within a predetermined or calculated amount of time 706. In numerous variations of the process 700, information corresponding to monitored load balancers may be used to generate or update the predictive model. The monitored data may also include the aggregate backend capacity associated with the load balancer. For example, the monitored data may include the current backend capacity of the set of computer systems the customer assigned to the load balancer.

Returning to FIG. 7, if the probability of the load balancing event occurring exceeds a threshold 708, one or more operations may then be performed. The operations may include determining a capacity associated with the load balancing event 710. For example, the predictive model may indicate that a daily increase in requests will occur within a certain period of time and the load balancer management subsystem may determine an amount of capacity to increase the load balancer in order to process the expected increase in traffic. Another example may include, determining an amount of capacity to deallocate from the load balancer as a result of the customer removing one or more computer systems from the set of computer system assigned to the load balancer. In various embodiments, determining the capacity associated with the load balancing event 710 includes estimating the amount of time required to allocate or deallocate computing resources to the load balancer, generating appropriate API requests, communicating with various systems of the computing resource service provider, determining operations to perform in order to complete the allocating or deallocation of computing resources to the load balancer, determining a storage location for a load balancer image, or any other operation required to enable the computing resource service provider to modify the capacity of the load balancer.

The computing resource service provider or suitable system thereof, such as the load balancer management subsystem, may then modify the load balancer capacity based at least in part on the determined capacity 712. For example, the predictive modeling system may determine that the probability of a particular load balancer experiencing a load balancing event and determine a capacity associated with the load balancing event. The capacity associated with the load balancing event may include some percentage of the maximum or minimum load handled by the particular load balancer in a previous interval of time. The capacity associated with the load balancing event may also include information obtained from the matching table as described above in connection with FIG. 2. Information obtained from the matching table may also indicate a type of load balancer or an amount of computing resources to allocate or deallocate to the load balancer. The load balancer may be allocated new load balancer nodes as described above in connection with FIG. 5. Allocation or deallocation of the load balancer nodes may cause the load balancer capacity to be modified to the determined capacity.

Figure 8:
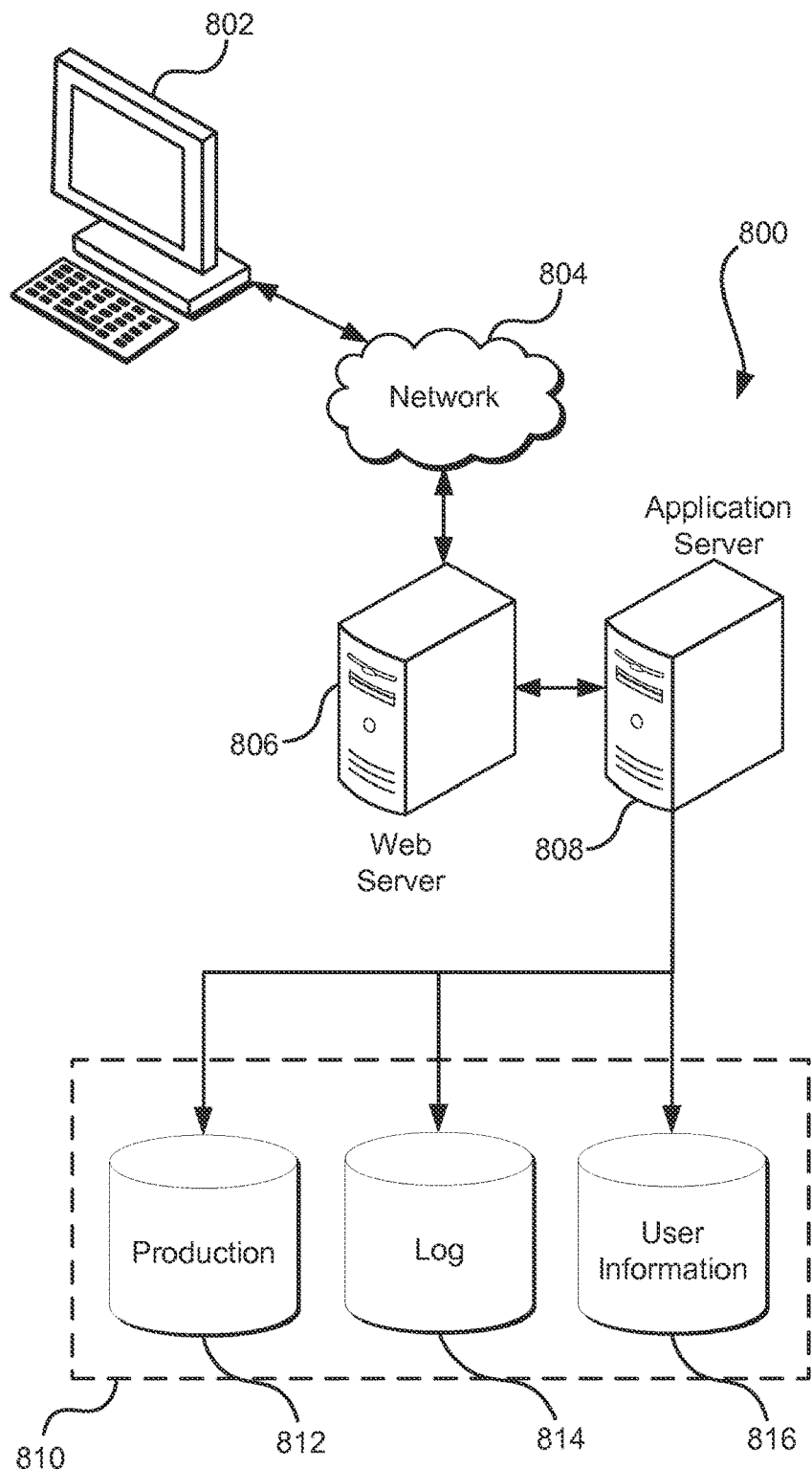
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 802 and the application server 808, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
under the control of one or more computer systems configured with executable instructions,
assigning a set of backend computer systems to a load balancer such that the load balancer is configured to distribute requests to the set of backend computer systems;
generating a predictive model for predicting a capacity need of the load balancer, by at least:
tracking an aggregate capacity of the set of backend computer systems;
determining, based at least in part on the tracked aggregate capacity of the set of backend computer systems, a ratio of the capacity need of the load balancer to the tracked aggregate capacity of the set of backend computer systems;
monitoring the aggregate capacity to determine a current backend capacity; and
using the predictive model to modify a load balancer capacity in accordance with the predictive model in response to the current backend capacity exceeding a threshold.

2. The computer-implemented method of claim 1, wherein using the predictive model further comprises using a matching table indicating the ratio of the aggregate capacity of the set of backend computer systems to the capacity need of the load balancer based at least in part on a utilization rate of the set of backend computer systems to modify the load balancer capacity based at least in part on information indicated in the matching table.

3. The computer-implemented method of claim 1, wherein tracking the aggregate capacity of the set of backend computer systems further includes tracking a number of requests directed to the set of backend computer systems.

4. The computer-implemented method of claim 1, wherein modifying the load balancer capacity in accordance with the predictive model further includes adjusting the load balancer capacity to a percentage of a maximum tracked aggregate capacity of the set of backend computer systems.

5. A system, comprising:
one or more processors; and
memory with instructions that, if executed by the one or more processors, cause the system to:
for a particular load balancer, use a predictive model to determine a capacity useable in modifying a set of computing resources of the particular load balancer, where the predictive model is based at least on a configuration of a set of computer systems associated with the particular load balancer;
determine to modify the particular load balancer based at least in part on the configuration; and
as a result of the determination, modify the set of computing resources of the particular load balancer to the capacity.

6. The system of claim 5, wherein the configuration of the set of computer systems includes at least one of the following:
process power of at least one computer system of the set of computer systems;
network bandwidth of the at least one computer system of the set of computer systems;
memory of the at least one computer system of the set of computer systems; and
a number of connections of the at least one computer system of the set of computer systems.

7. The system of claim 5, wherein the memory further includes instructions that, if executed by the one or more processors, cause the system to:
determine a rate to modify the set of computing resources of the particular load balancer to the capacity; and
modify the set of computing resources of the particular load balancer to the capacity at the determined rate.

8. The system of claim 5, wherein the memory further includes instructions that, if executed by the one or more processors, cause the system to generate the predictive model based at least in part on traffic patterns of the set of computer systems over an interval of time.

9. The system of claim 5, wherein the instructions that cause the computer system to determine to modify the particular load balancer further include instructions that cause the computer system to determine to modify the particular load balancer in response to a request from a customer to modify the configuration.

10. The system of claim 5, wherein the instructions that cause the computer system to modify the set of computing resources of the particular load balancer further include instructions that cause the computer system to instantiate an additional load balancer node with an additional capacity corresponding to the capacity.

11. The system of claim 5, wherein the instructions that cause the computer system to modify the set of computing resources of the particular load balancer further include instructions that cause the computer system to assign one or more cached load balancer nodes to the particular load balancer.

12. The system of claim 11, wherein assigning the one or more cached load balancer nodes to the particular load balancer further includes updating an entry in a naming system service associated with the load balancer.

13. A non-transitory computer-readable storage medium having stored thereon executable instructions that, if executed by one or more processors of a computer system, cause the computer system to:
generate a model of a capacity requirement of a load balancer based at least in part on a configuration of a set of servers for which the load balancer is responsible for distributing traffic to;
track the configuration of the set of servers;
use the model to determine an amount of capacity by which to adjust the load balancer based at least in part on the tracked configuration; and
adjust the load balancer by the determined amount of capacity.

14. The non-transitory computer-readable storage medium of claim 13, wherein the executable instructions that cause the computer system to track the configuration of the set of servers further include instructions that cause the computer system to track utilization of at least one of the following: network bandwidth; number of processors; memory usage; storage space; number of network interfaces; number of distributed servers; type of traffic received by at least one server of the set of servers; and utilization one or more servers of the set of servers.

15. The non-transitory computer-readable storage medium of claim 13, wherein the adjusting the load balancer by the determined amount of capacity comprises adding computing resources to the load balancer.

16. The non-transitory computer-readable storage medium of claim 13, wherein the adjusting the load balancer by the determined amount of capacity comprises removing computing resources from a set of computing resources allocated to the load balancer.

17. The non-transitory computer-readable storage medium of claim 13, wherein the executable instructions further comprise instructions that, if executed by the one or more processors, cause the computer system to:
 track a rate of traffic directed to the set of servers over an interval of time; and
 update the model based at least in part on the rate of traffic.

18. The non-transitory computer-readable storage medium of claim 17, wherein the executable instructions further comprise instructions that, when executed by the one or more processors, cause the computer system to use the updated model to determine the amount of capacity to adjust the load balancer.

19. The non-transitory computer-readable storage medium of claim 13, wherein the executable instructions further comprise instructions that, if executed by the one or more processors, cause the computer system to:
 receive an application programming interface call configured to modify the configuration of the set of servers by at least adding an additional server to the set of servers for which the load balancer is responsible for distributing traffic to; and
 adjust the load balancer by an additional capacity as a result of the application programming interface call.

20. The non-transitory computer-readable storage medium of claim 13, wherein the executable instructions that cause the computer system to track the configuration of the set of servers further include instructions that cause the computer system to track a user input to the set of servers and update the model based at least in part on the tracked user input.

* * * * *